US012092307B2

(12) United States Patent
Koerdt et al.

(10) Patent No.: US 12,092,307 B2
(45) Date of Patent: Sep. 17, 2024

(54) COOLING DEVICE FOR AN ILLUMINATION UNIT ON A MOTOR VEHICLE

(71) Applicant: HELLA GmbH & Co. KGaA, Lippstadt (DE)

(72) Inventors: Christian Koerdt, Geseke (DE); Alexander Musch, Lippstadt (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 18/387,650

(22) Filed: Nov. 7, 2023

(65) Prior Publication Data

US 2024/0068653 A1 Feb. 29, 2024

Related U.S. Application Data

(63) Continuation of application No. PCT/EP2022/060508, filed on Apr. 21, 2022.

(30) Foreign Application Priority Data

May 7, 2021 (DE) ..................... 10 2021 111 933.2

(51) Int. Cl.

| | |
|---|---|
| ***F21V 29/00*** | (2015.01) |
| ***F21S 45/49*** | (2018.01) |
| ***F21V 29/67*** | (2015.01) |
| ***F21V 29/70*** | (2015.01) |
| *F21Y 115/10* | (2016.01) |

(52) U.S. Cl.

CPC ............ *F21V 29/677* (2015.01); *F21S 45/49* (2018.01); *F21V 29/70* (2015.01); *F21Y 2115/10* (2016.08)

(58) Field of Classification Search

CPC ......... F21V 29/677; F21V 29/70; F21S 45/49

See application file for complete search history.

(56) References Cited

U.S. PATENT DOCUMENTS

| | | | |
|---|---|---|---|
| 9,121,561 B2 | 9/2015 | Thullier et al. | |
| 9,816,696 B1 * | 11/2017 | Clifford | F21V 29/74 |
| 9,958,129 B2 | 5/2018 | Ruckebusch | |
| 10,337,690 B2 | 7/2019 | Tessnow et al. | |
| 10,359,169 B2 | 7/2019 | Kawai et al. | |
| 2014/0036523 A1 | 2/2014 | Thullier et al. | |
| 2018/0222379 A1 | 8/2018 | Ruckebusch et al. | |

(Continued)

FOREIGN PATENT DOCUMENTS

| | | |
|---|---|---|
| CN | 208566550 U | 3/2019 |
| CN | 109973923 A | 7/2019 |

(Continued)

OTHER PUBLICATIONS

International Search Report dated Aug. 3, 2022 in corresponding application PCT/EP2022/060508.

*Primary Examiner* — Gerald J Sufleta, II

(74) *Attorney, Agent, or Firm* — Muncy, Geissler, Olds & Lowe, P.C.

(57) ABSTRACT

A cooling device for a lighting unit of a motor vehicle, in particular for an LED headlight, at least comprising a metallic base plate, a heat sink, and a fan that is accommodated on a fan mount. The heat sink and the fan mount are situated on the base plate in such a way that an air flow that is generatable by the fan is directed onto the heat sink. The fan mount being made of a metal.

10 Claims, 4 Drawing Sheets

(56) References Cited

U.S. PATENT DOCUMENTS

| | | | | |
|---|---|---|---|---|
| 2018/0266646 | A1* | 9/2018 | Sanchez | F21S 41/153 |
| 2018/0274775 | A1* | 9/2018 | Redjem Saad | F21V 29/773 |
| 2019/0316751 | A1* | 10/2019 | Mayer | F21S 45/43 |

FOREIGN PATENT DOCUMENTS

| | | | | |
|---|---|---|---|---|
| DE | 102012222340 | A1 * | 6/2014 | H01L 23/467 |
| DE | 102013017022 | A1 | 4/2015 | |
| EP | 2598793 | B1 | 4/2021 | |
| JP | 2014203993 | A | 10/2014 | |
| KR | 20160034682 | A | 3/2016 | |
| WO | WO2009110085 | A1 | 9/2009 | |
| WO | WO2016013447 | A1 | 1/2016 | |

* cited by examiner

COOLING DEVICE FOR AN ILLUMINATION UNIT ON A MOTOR VEHICLE

This nonprovisional application is a continuation of International Application No. PCT/EP2022/060508, which was filed on Apr. 21, 2022, and which claims priority to German Patent Application No. 10 2021 111 933.2, which was filed in Germany on May 7, 2021, and which are both herein incorporated by reference.

BACKGROUND OF THE INVENTION

Field of the Invention

The present invention relates to a cooling device for a lighting unit of a motor vehicle, in particular for an LED headlight, at least comprising a metallic base plate, a heat sink, and a fan that is accommodated on a fan mount, the heat sink and the fan mount being situated on the base plate in such a way that an air flow that is generatable by the fan is directed onto the heat sink.

Description of the Background Art

Cooling devices are known in the prior art for dissipating the operating heat from motor vehicle lighting units. In particular for high-performance headlights, for example based on matrix LED modules as illuminant, active cooling devices are used which generally include a heat sink and an associated fan, the heat sink being in thermal contact with the light modules, and an air flow for cooling, generated by the fan, being directed onto the heat sink. The heat sink and the fan are situated on a shared base plate, for which purpose the fan is generally accommodated in a typically multipart fan mount made of plastic.

To increase the cooling power of an active cooling device, DE 10 2012 222 340 A1 proposes to allow the surface that is swept by the fan impeller to protrude, on at least one side, beyond the surface that is formed by the facing end-face side of the heat sink in such a way that the air flow generated by the fan impeller not only flows through the heat sink, but also contributes to the cooling of surrounding components.

SUMMARY OF THE INVENTION

It is therefore an object of the present invention to provide an alternative design of a cooling device for a lighting unit of a motor vehicle, which has optimized cooling power with compact installation dimensions.

The invention encompasses the technical teaching that the fan mount is made of a metal.

The invention is based on the concept of utilizing the high thermal conductivity of metals in order to involve the fan mount to a significant extent in the dissipation of the operating heat of the illuminant. The design of the fan mount made of a metal ensures rapid heat transfer from the metallic base plate to the fan mount, as well as rapid and homogeneous heating of the entire fan mount, whose free surface thus contributes to the heat output via thermal radiation, in particular convection. In comparison to the common use in the prior art of a fan mount made of a plastic, the cooling device according to the invention thus has higher cooling power without having to increase the installation dimensions of the cooling device or the power of the fan.

The fan mount can have a one-piece design. A one-piece and in particular single-material design avoids thermal resistances that occur at the contact point between different components in a multipart design, and thus ensures homogeneous and rapid heating of the entire fan mount. A further advantage of the one-piece design is the ease of assembling and disassembling the cooling device compared to the fan mounts from the prior art, which usually have a multipart design.

It is also advantageous that the fan mount has a contact section, the contact section forming a large-surface contact with the base plate. The contact between the contact section and the base plate forms the important heat transfer between the components, and a large-surface design ensures a large heat flow into the fan mount, which is necessary for effective heat dissipation. The contact between the contact section and the base plate may, for example, have a flat extension that takes up a large part of the surface area of the base plate that is not occupied by the heat sink.

A heat conduction medium, in particular a thermally conductive foil or a thermally conductive paste, may preferably be arranged between the base plate and a contact section of the fan mount situated on the base plate. The contact section has the contact surface which is provided for the heat transfer from the base plate to the fan mount, and a heat conduction medium situated between this contact surface and the base plate ensures that the entire contact surface is in thermal contact with the base plate. Any unevenness on the contact surface or on the surface of the base plate is compensated for by the heat conduction medium. Thermally conductive foils and thermally conductive pastes are based, for example, on a silicone elastomer or silicone oil, and may contain functional additives for increasing the thermal transmission coefficient.

The fan mount can have a frame-like receiving section for accommodating the fan. A frame-like receiving section, i.e., a section that circumferentially surrounds the fan, has a large free surface and is therefore particularly suitable for heat dissipation. In addition, it is possible to quickly and easily assemble and disassemble the fan in such a frame-like receiving section.

For example, the fan mount can have elastically deformable joints, so that the fan is assembled with the fan mount via flexible spreading. During assembly, for the flexible spreading the joints are initially elastically deformed, and after the fan is pushed into its final position in the fan mount, elastic recovery of the joints takes place, and a pretensioned retaining connection is established between the fan and the fan mount.

The fan mount is preferably designed as a stamped/bent part. Stamping and bending processes ensure a high degree of design freedom, and are particularly suitable for manufacturing a one-piece fan mount.

For example, the fan mount is made of a steel. Although steels have a lower thermal conductivity compared to other metals such as aluminum or copper, they provide the necessary mechanical properties, as a fan mount, to ensure a vibration-free and robust mounting of the fan. Depending on the specific embodiment of the cooling device, for example stainless steels, hardened steels, or tempered steels may be used.

For example, the fan mount can be fastened to the base plate by means of screw connections and/or rivet connections. In particular, the fastening must take place in such a way that there is large-surface contact between the base plate and the fan mount, thus ensuring efficient heat transfer between these components.

The fan mount and the heat sink can be arranged on a rear side of the base plate, with a front side of the base plate being provided for accommodating an illuminant of the lighting unit. Heat is thus dissipated from the illuminant via the rear side of the base plate facing away from the illuminant.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
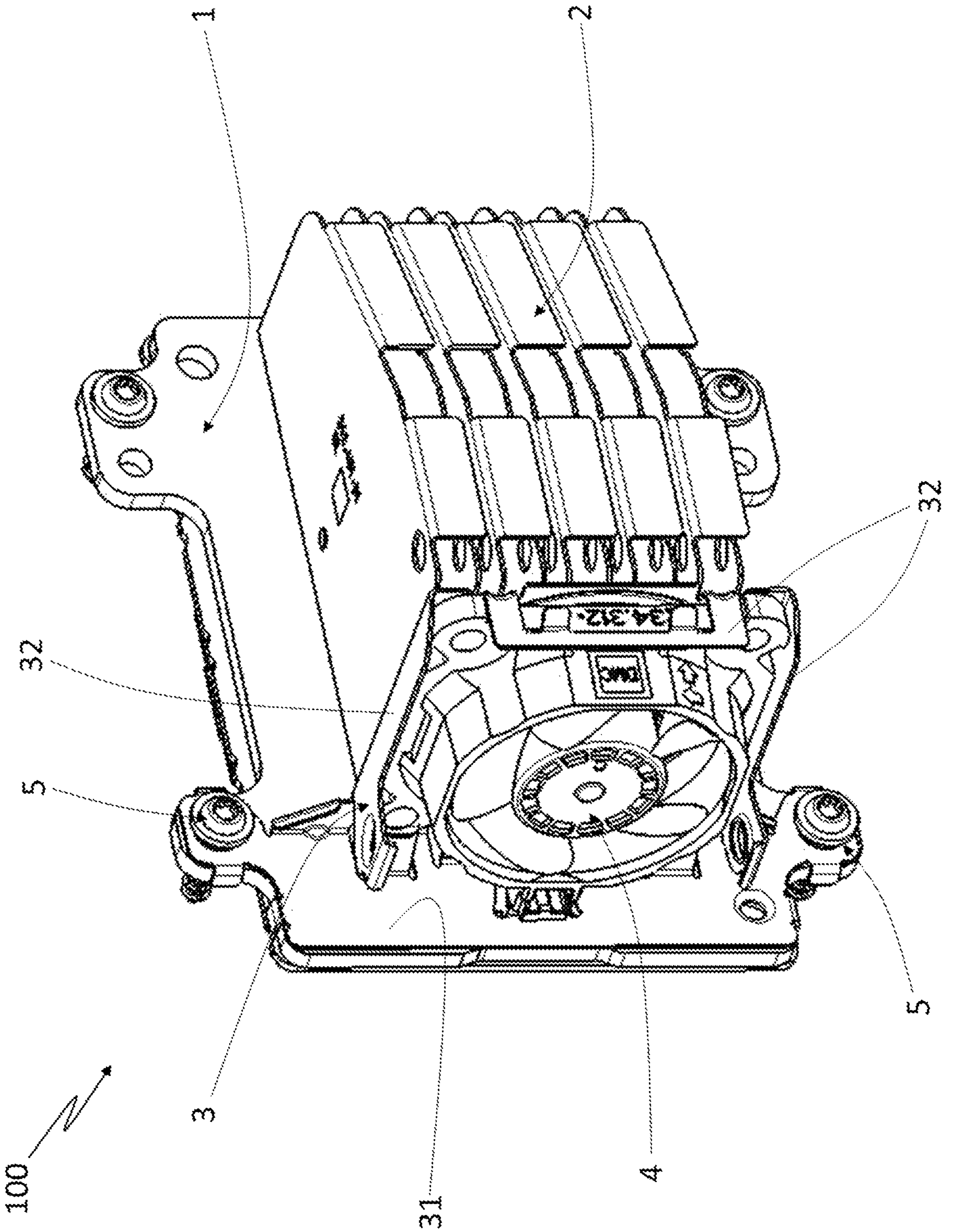
FIG. 1 shows a perspective view of a cooling device according to the invention.

FIG. 1 shows a perspective view of a cooling device 100 according to the invention, comprising the metallic base plate 1, the heat sink 2, and the fan 4 accommodated at the fan mount 3; the heat sink 2 and the fan mount 3 are situated on the base plate 1 in such a way that an air flow that is generatable by the fan 4 is directed onto the heat sink 2. The heat sink 2 and the fan mount 3 are situated on the rear side 11 of the base plate 1, and the opposite, front side of the base plate 1 which faces away is provided to accommodate an illuminant of the lighting unit, in particular a matrix LED module, as a light module of a headlight.

According to the invention, the fan mount 3 is made of a metal, and has a one-piece and one-material design. The contact section 31 of the fan mount 3 forms a large-surface contact with the base plate 1, which is fixed by the screw connections 5. A heat conduction medium, which ensures a large effective contact surface of the thermal transfer between the base plate 1 and the contact section 31, is preferably situated between the base plate 1 and the contact section 31. According to the invention, the surface of the contact section 31 facing away from the base plate 1 as well as the surface of the frame-like receiving section 32, which extends circumferentially around the fan 4, function as additional cooling surfaces; i.e., the heat that is introduced by the illuminant into the fan mount 3 via the base plate 1 may be dissipated via these surfaces, in particular by convection.

Figure 2A:
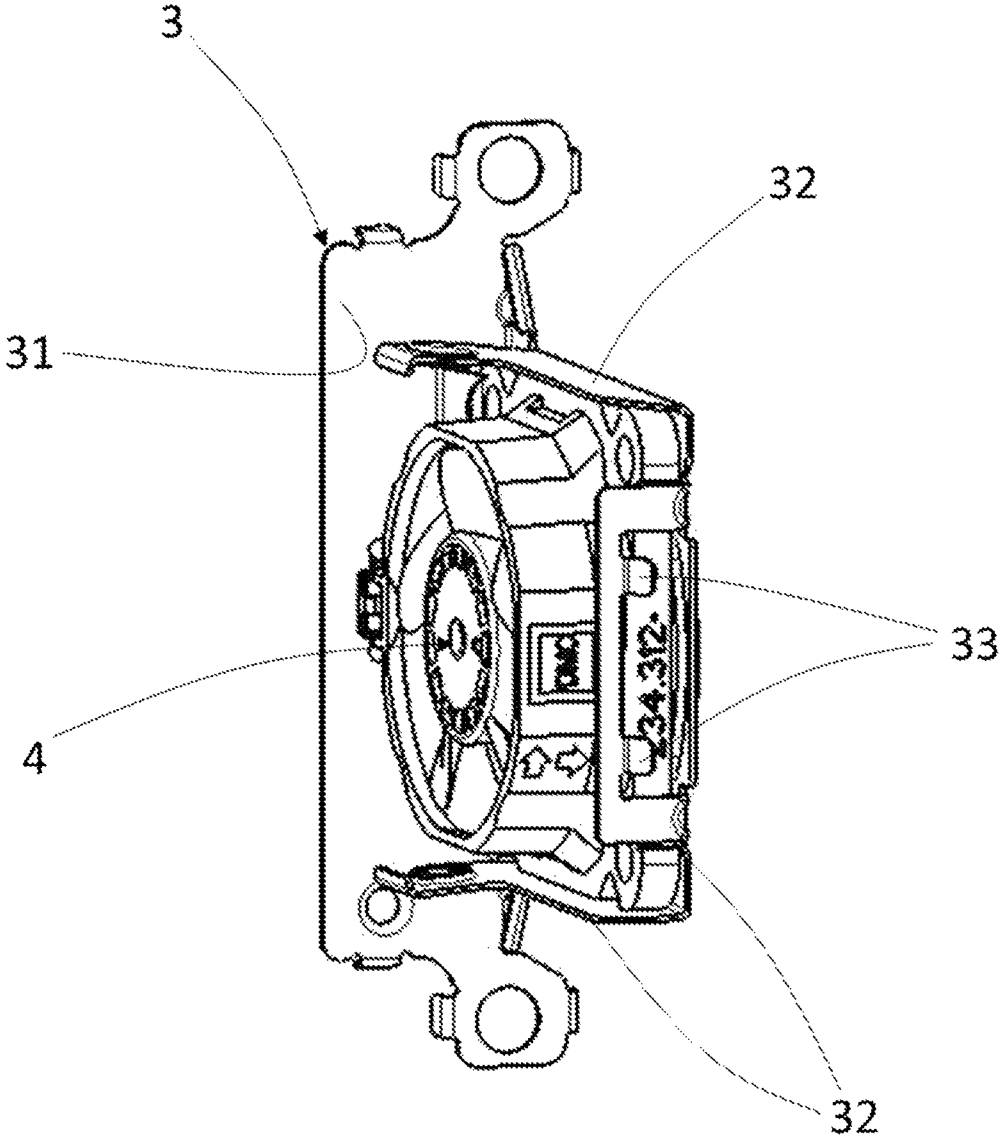
FIGS. 2*a* and 2*b* show perspective views of a fan mount according to the invention with a fan.
Figure 2B:
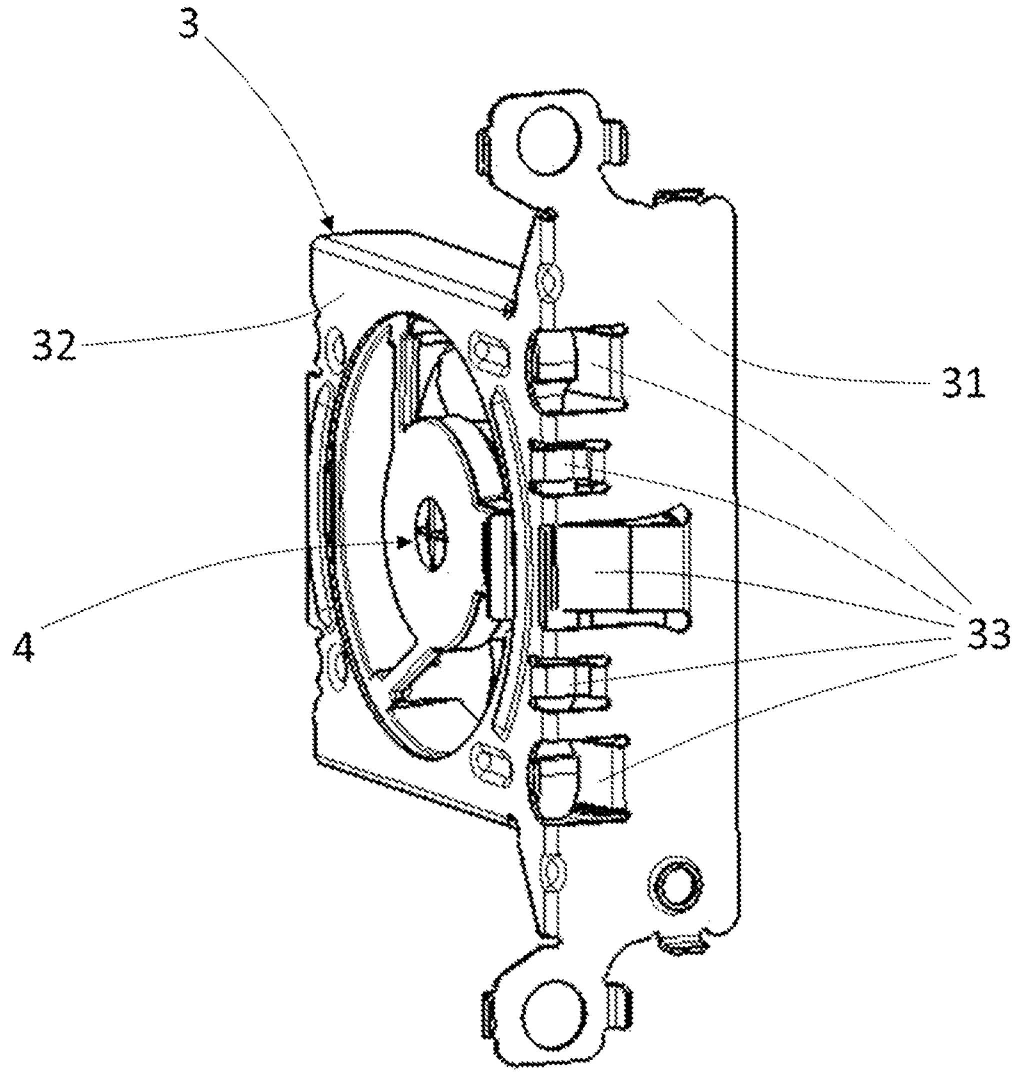

FIGS. 2*a* and 2*b* show perspective views of the fan mount 3 according to the invention together with the fan 4 accommodated therein. Visible are the joints 33, which in the form of elastically deformable tongues are integrally formed on the side in the receiving section 32, and which, during insertion of the fan 4 into the receiving section 32, are initially elastically deformed and subsequently pretension the fan 4 in the direction of the opposite side of the frame-like receiving section 32, resulting in a retaining connection. The elastically deformable joints 33 are in particular also able to damp, to a certain degree, vibrations that occur during operation of the fan 4.

Figure 3:
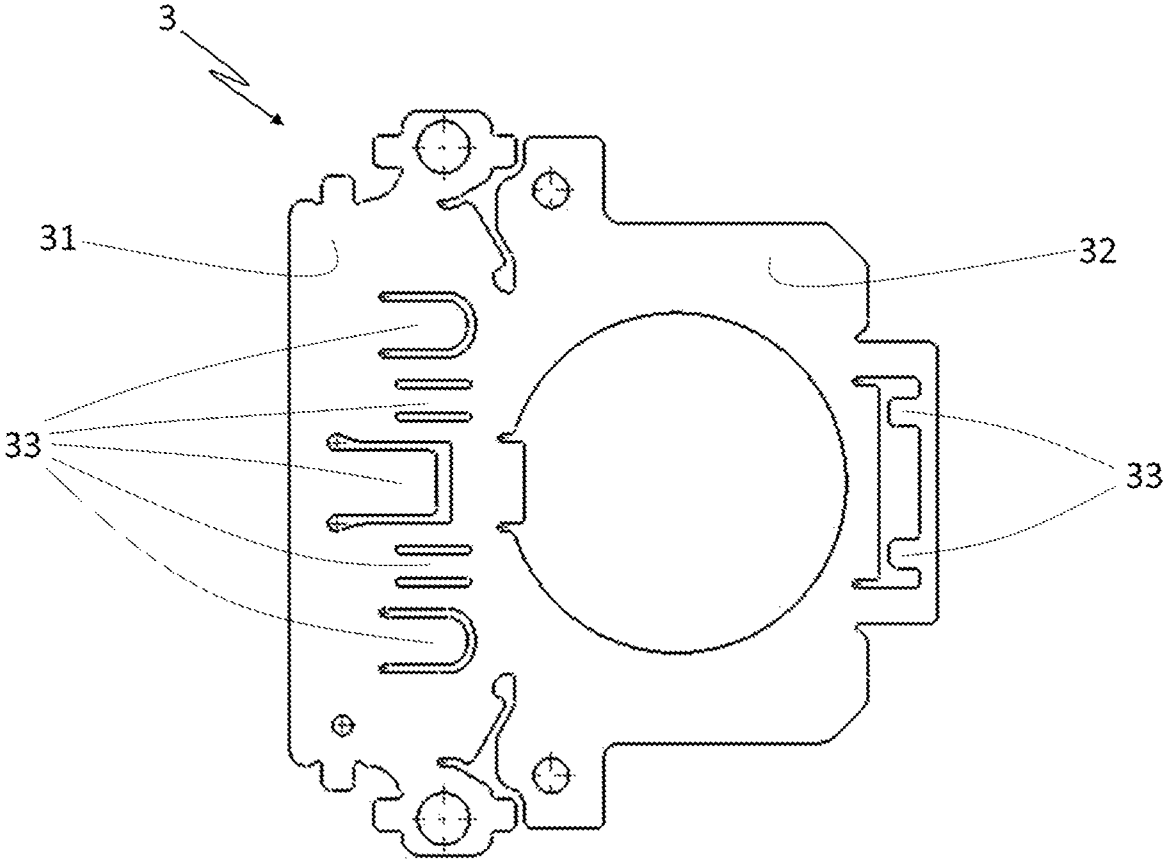
FIG. 3 shows a flattened-perspective illustration of a fan mount according to the invention.

FIG. 3 shows a perspective illustration of the fan mount 3 according to the invention which is completely flattened into the plane of the drawing, and which as a one-piece stamped/bent part is made of sheet metal. According to the invention, the surfaces of the contact section 31 and of the receiving section 32 are available for additional heat output.

The implementation of the invention is not limited to the preferred exemplary embodiment stated above. Rather, a number of variants are conceivable which make use of the described approach, also for basically different types of designs. All features and/or advantages, including structural details, spatial configurations, and method steps, that arise from the claims, the description, or the drawings may be important to the invention, alone or also in the various combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cooling device for a lighting unit of a motor vehicle, the cooling device comprising:

a metallic base plate;

a heat sink; and a fan that is arranged on a fan mount, wherein the heat sink and the fan mount are arranged on a first surface of the base plate such that an air flow that is generatable by the fan is directed onto the heat sink, wherein the fan mount is made of a metal, wherein the fan mount has a contact section that extends parallel to the first surface of the base plate and is arranged on the base plate, such that the contact section forms a large-surface contact with the base plate, wherein the fan mount has a frame-shaped receiving section for accommodating the fan, the frame-shaped receiving section being formed by side walls that extend perpendicularly from a base wall, and wherein one of the side walls of the frame-shaped receiving section is formed by the contact section.

2. The cooling device according to claim 1, wherein the fan mount has a one-piece design.

3. The cooling device according to claim 1, wherein a heat conduction medium, a thermally conductive foil or a thermally conductive paste is arranged between the first surface of the base plate and the contact section of the fan mount.

4. The cooling device according to claim 1, wherein the fan mount has elastically deformable joints so that the fan is assembled with the fan mount via flexible spreading.

5. The cooling device according to claim 1, wherein the fan mount is designed as a stamped and bent part.

6. The cooling device according to claim 1, wherein the fan mount is made of a steel.

7. The cooling device according to claim 1, wherein the contact section of the fan mount is fastened to the base plate by screw connections and/or rivet connections.

8. The cooling device according to claim 1, wherein the first surface of the base plate, on which the fan mount and the heat sink are arranged, is a rear side of the base plate, and wherein a front side of the base plate is provided for accommodating an illuminant of the lighting unit.

9. The cooling device according to claim 1, wherein the lighting unit is an LED headlight.

10. The cooling device according to claim 1, wherein the base wall of the frame-shaped receiving section of the fan mount extends perpendicular to the first surface of the base plate.

* * * * *